United States Patent [19]

Rolleston

[11] Patent Number: 5,592,591
[45] Date of Patent: Jan. 7, 1997

[54] REDUCED STORAGE OF PRE-COMPUTED DIFFERENCE TABLES USED IN COLOR SPACE CONVERSION

[75] Inventor: Robert J. Rolleston, Penfield, N.Y.

[73] Assignee: Xerox Corporation, Stamford, Conn.

[21] Appl. No.: 131,168

[22] Filed: Oct. 4, 1993

[51] Int. Cl.$^6$ .............................. G06F 15/00; H04N 1/46
[52] U.S. Cl. .............................................. 395/105; 358/518
[58] Field of Search ........................................ 395/105, 109, 395/131, 100, 115, 128, 132, 164; 358/512, 515, 518, 524, 525; 382/163, 164, 165, 166, 167; 345/153, 154; 364/723

[56] References Cited

U.S. PATENT DOCUMENTS

| | | | |
|---|---|---|---|
| 2,790,844 | 4/1957 | Neugebauer | 178/5.2 |
| 4,060,829 | 11/1977 | Sakamoto | 358/80 |
| 4,275,413 | 6/1981 | Sakamoto et al. | 358/80 |
| 4,328,515 | 5/1982 | Wellendorf | 358/518 |
| 4,477,833 | 10/1984 | Clark et al. | 358/80 |
| 4,500,919 | 2/1985 | Schreiber | 358/78 |
| 4,511,989 | 4/1985 | Sakamoto | 364/723 |
| 5,301,016 | 4/1994 | Gehrmann | 348/586 |
| 5,377,025 | 12/1994 | Spaulding et al. | 358/518 |
| 5,412,766 | 5/1995 | Pietras et al. | 395/131 |

OTHER PUBLICATIONS

Po–Chieh Hung, "Tetrahedral Division Technique Applied to Colorimetric Calibration for Imaging Media", Ahhual Meeting IS&T, NJ, May, 1992, pp. 419–422.

Po–Chieh Hung, "Colorimetric Calibration for Scanners and Media", SPIE, vol. 1448, Camera and Input Scanner System (1991).

Sigfredo I. Nin et al, "Printing CIELAB Images on a CMYK Printer Using Tri–Linear Interpolation", SPIE Proceedings, vol. 1670, 1992, pp. 316–324.

James M. Kasson et al; "A Tetrahedral Interpolation Technique for Color Space Conversion"; presented at IS&T/SPIE Electronic Imaging, Jan., 1993; pp. 1–12.

Kanamori et al; "Fast Color Processor with Programmable Interpolation by Small Memory (PRISM)"; Journal of Electronic Imaging; vol. 2, No. 3, Jul. '93; Bellingham, WA; pp. 213–224.

Primary Examiner—Edward L. Coles, Sr.
Assistant Examiner—Gabriel I. Garcia
Attorney, Agent, or Firm—Mark Costello

[57] ABSTRACT

An interpolation calculation requires a plurality of difference signals representing the distances to a set of neighboring colors in space. However, at least some of the plurality of difference signals required for interpolation of a color within the boundary defined by the known color and the set of neighboring colors are also required for interpolation of another color within the boundaries defined by a neighboring known color and its set of neighboring known colors. Accordingly, rather than redundantly storing the difference values, a storage and retrieval scheme is used which only stores non-redundant difference signals, and retrieves from addresses associated with neighboring colors the appropriate difference signals for a given interpolation calculations.

20 Claims, 8 Drawing Sheets

REDUCED STORAGE OF PRE-COMPUTED DIFFERENCE TABLES USED IN COLOR SPACE CONVERSION

FIELD OF THE INVENTION

The present invention is directed towards compiling and using look-up tables storing calculated difference values required for conversion of colors defined in a first color space to colors defined in a second color space, and more particularly to a method of reducing redundancy in such storage for more efficient operation.

CROSS REFERENCE

Cross reference is made to the following co-pending application U.S. Ser. No. 07/955,075, filed Oct. 1, 1992, entitled "Color Printer Calibration Architecture", by R. J. Rolleston et al. (assigned to the same assignee as the present application).

INCORPORATION BY REFERENCE

The following patents are specifically incorporated by reference: U.S. Pat. No. , 4,500,919 to Schreiber for its teachings of a color conversion system converting information from RGB to CMYK; U.S. Pat. No. 4,275,413 to Sakamoto and U.S. Pat. No. 4,511,989 to Sakamoto for its teachings of tetrahedral interpolation between first and second color spaces; and U.S. Pat. No. 2,790,844 to Neugebauer disclosing the desirability of defining an image in a first standard color space prior to conversion of the image coordinates to a second printer based coordinate system.

BACKGROUND OF THE INVENTION

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image. Scanners commonly operate with colors defined in a color space of tristimulus values, i.e., RGB (red-green-blue). Commonly, these values are a linear transformation of the standard XYZ coordinates of CIE color space, or a correct transform of those values. In the case of computer generated images, colors defined by the user at the user interface of his workstation are immediately converted into color space values and directed out of the system as defined in the document colors.

Printers have an output which can be defined as existing in a color space called CMYK (cyan-magenta-yellow-key or black) which is uniquely defined for the printer by its capabilities and colorants. Printers operate by the addition of multiple layers of ink or colorant in layers to a page. The response of the printer tends to be relatively non-linear. Thus, while a printer system receives information in a first color space, it must convert that information to print in a second color space.

The desirability of operating in a tristimulus color space with subsequent conversion to a printer colorant color space is well known, such as shown by U.S. Pat. No. 4,500,919 to Schreiber and U.S. Pat. No. 2,790,844 to Neugebauer, and U.S. Pat. No. 4,275,413 to Sakamoto. There are many methods of conversion between color spaces, all of which begin with the measurement of printer response to certain input values. Commonly, a printer is driven with a set of color input values, the values are printed in normal operation of the printer, and measurements are made of those colors to determine what the actual color printed was in response to the color specification. As previously noted, most printers have non-linear response characteristics.

In U.S. Pat. No. 4,500,919 to Schreiber, and U.S. Pat. No. 4,275,413 to Sakamoto, the information derived was placed into look-up tables, stored in a memory, perhaps ROM memory or RAM memory where the look-up table relates input color space to output color space. The look-up table is commonly a three dimensional table since color space is three dimensional. In RGB space, at a scanner or computer, space can be defined as three dimensional with black at the origin of a three dimensional coordinate system 0, 0, 0 and white at the maximum of a three dimensional coordinate system which an 8-bit system, would be located at 255, 255, 255. Each of the three axes radiating from the origin point therefore respectively define red, green, and blue and points therebetween in the volume of the cube defining colors resulting from the combinations of the additive primary colors. A similar construct can be made for the printer, with axes representing cyan, magenta, and yellow. Black is usually a separate toner which is added separately. In the 8-bit system suggested, there will be, however, over 16 million possible colors ($256^3$). There are clearly too many values for a 1:1 mapping of RGB to CMYK. Accordingly, as proposed in U.S. Pat. No. 4,275,413 to Sakamoto, only a relatively small number of samples are made at the printer, perhaps on the order of 1000–4000. Therefore, the look-up tables (LUT's) consist of a set of values which could be said to be the intersections for corners of a set of rectangular parallelepipeds mounted on top of one another. Colors falling within each rectangular volume can be interpolated from the measured values, through many methods including tri-linear interpolation, tetrahedral interpolation, polynomial interpolation, linear interpolation, and any other interpolation method depending on the accuracy of the desired result.

The interpolation methods described all require information about the grids, and particularly, require information about the distance between adjacent points in space on the grid. The input color space grid has nodes spaced at regular intervals, and accordingly the distance values are derived by simple monotonic functions. The output color space grid is empirically measured and accordingly the nodes are at irregular intervals, which are often not describable by simple functions. In the example of FIG. 1, the regular array of data values in the input color space LUT are indicated by X's, and the point marked with an O is to be derived by interpolation therefrom (as will become apparent, this is a simplified two dimensional example). The LUT holds the value of the function H(x,y) for the points (x[i], y[j]) where x[i] and y[j] are some set of discrete values referred to as the grid points, node points, or lattice points and i runs from 0 to M−1 and j runs from 0 to N−1 (thus giving an M×N LUT size). In an example illustrated in FIG. 2, three dimensional tetrahedral interpolation is reduced to two dimensions or triangular interpolation and the value for the desired point is given by:

$$H(x,y)=H[i][j]+\Delta x.(H[i+1][j]-H[i][j])+\Delta y.(H[i+1][j+1]-H[i+1][j])$$

where $$\Delta x=(x-x[i])/(x[i+1]-x[i]),$$

and $\Delta y=(y-y[j])/(y[j+1]-y[i])$.

The equations are modified appropriately if the point lies in the upper triangle.

Notice that the differences between the known table values (i.e. $(H[i+1][j]-H[i][j])$, etc . . . ) must be calculated for the interpolation of each color which falls within the triangle defined by $(i,j)-(i+1,j)-(i+1,j+1)$ and therefore using this difference. When performing interpolations for a large number of pixels (i.e. an scanned image) it may be advantageous to compute all the possible differences once, store them, and then use them when needed. The tradeoff in doing this is the time for computing the differences during each interpolation operation versus the cost of having to store and access the differences.

The easiest way to store and access these differences is to go to each rectangle in the plane (or rectangular solid in the three dimensional space) and compute all the differences associated with that rectangle. With reference to FIG. 2, in the two dimensional example this means that four differences for each node point in the table must be stored:

$$\Delta H_{x1}[i][j]=H[i+1][j]-H[i][j]$$

$$\Delta H_{x2}[i][j]=H[i+1][j+1]-H[i][j+1]$$

$$\Delta H_{y2}[i][j]=H[i][j+1]-H[i][j]$$

$$\Delta H_{y1}[i][j]=H[i+1][j+1]-H[i+1][i]$$

These differences correspond to the differences in the x-direction along the top and bottom of a rectangle with the $H[i][j]$ at the lower left hand node, and the differences in the y-direction along the left and right hand sides of the triangle formed by the diagonal of this rectangle. In the three dimensional case, 12 difference values are stored. This is a significant memory overhead, and methods of reducing the overhead are desired.

The references cited herein are incorporated by reference for the teachings.

SUMMARY OF THE INVENTION

In accordance with the invention, there is provided a method and apparatus for storing difference information which reduces redundancy of stored information, and therefore storage space, while minimally affecting processing time.

In accordance with one aspect of the invention, in a system for converting from a first color space to a second color space, where a set of empirically derived output colors are stored, mapped to selected input colors distributed through the color space, and wherein for an input color which is not mapped to an output color, an interpolation process is used to provide an output color, there is provided a method of improving the efficiency of the interpolation value including:

calculating means for calculating the distance in color space between each known color and each known neighboring color, and producing a set of difference signals representing the distances;

a difference memory, storing the difference signals received from the calculating means, the difference signals stored at a plurality of addresses in the difference memory associated with the known color for which the difference signals are calculated;

control means, controlling the storage of the digital difference signals, and directing from the calculating means to the difference memory at addresses associated with a known color only such digital difference digital distance signals as have not been previously stored for a neighboring known color;

the control means controlling the retrieval of the difference signals for interpolation processing from addresses associated with the known color and neighboring known colors, as required to provide the correct distance signals for interpolation processing.

As described, the interpolation calculation requires a plurality of difference signals representing the distances to a set of neighboring colors in space. However, at least some of the plurality of difference signals required for interpolation of a color within the boundary defined by the known color and the set of neighboring colors are also required for interpolation of another color within the boundaries defined by a neighboring known color and its set of neighboring known colors. Accordingly, rather than redundantly storing the difference values, a storage and retrieval scheme is used which only stores non-redundant difference signals, and retrieves from addresses associated with neighboring colors the appropriate difference signals for a given interpolation calculation.

These and other aspects of the invention will become apparent from the following descriptions to illustrate a preferred embodiment of the invention read in conjunction with the accompanying drawings in which.

Figure 3:
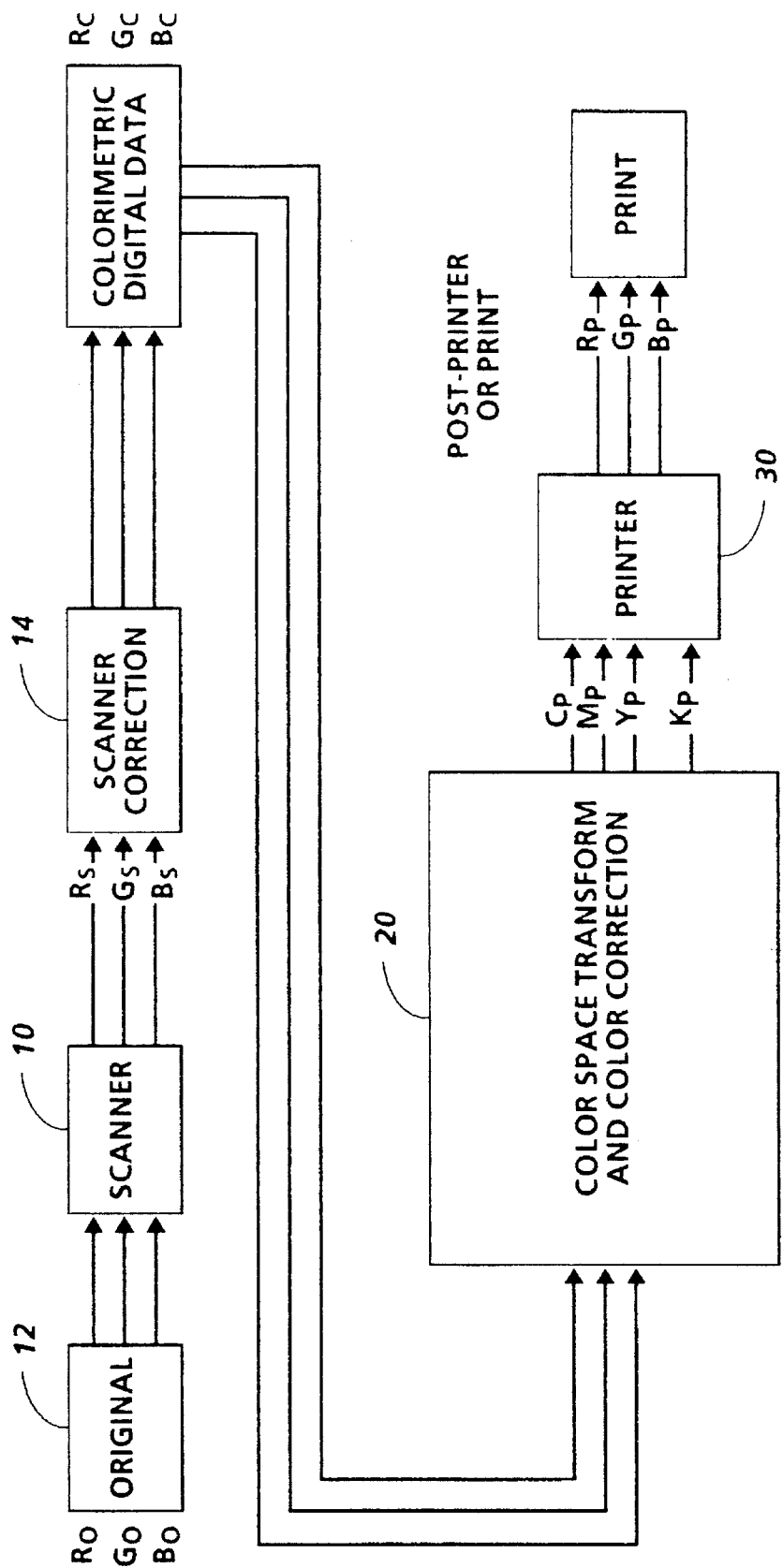
FIG. 3 is a block diagram of a scanning/printing system with color transformation, for converting device independent image descriptions to device dependent image descriptions.

Referring now to the drawings where the showings are for the purpose of describing an embodiment of the invention and not for limiting same, a basic system for carrying out the present invention is shown in FIG. 3. In a system, a scanner 10, such as perhaps the color scanner available in the Xerox 5775 digital color copiers, which can be calibrated to produce a set of digital colorimetric or device independent data describing a scanned image 12, which, by definition can be defined in terms of R, G, B space. Resulting from the scanning operation is a set of scanner image signals $R_s$, $G_s$, $B_s$, defined in device dependent scanner terms. Incorporated into the scanner or another processing path is a post-scanning processor 14, which provides correction of scanner image signals $R_s$, $G_s$, $B_s$ to colorimetric terms, $R_c$, $G_c$, $B_c$, typically digital in nature. The values may be in terms of CIE color space (r,g,b), or the L*a*b* luminance-chrominance space $(LC_1C_2)$. A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant driving signal $C_p$, $M_p$, $Y_p$, $K_p$ that will be used to drive a printer 30. In one possible example, the colorant values represent the relative amounts of cyan, magenta, yellow, and black toners that are to be deposited over a given area in an electrophotographic printer, such as, again, Xerox 5775 digital color copiers. The printed output image may be said to be defined in terms of $R_p$, $G_p$, $B_p$, which are hoped to have a relationship with $R_o$, $G_o$, $B_o$ such that the printer has a color that is colorimetrically similar to the original image, although that similarity is ultimately dependent upon the gamut of the printing device. As described in U.S. patent application Ser. No. 07/955,075 by Rolleston, entitled "Color Printer Calibration Architecture", black addition for under color removal and gray balance processing may also be combined into the color space transform element. Although these features are not required, they are desirable and are illustrated herein. When we refer to colorimetric spaces, we are referring to spaces which are transforms of CIE XYZ space (1931). When we refer to device dependent space, we refer to a color space which is defined only in terms of operation of the device using it. While many color spaces have three dimensions, it is possible to have color spaces with less than three dimensions or more than three dimensions.

Figure 4:
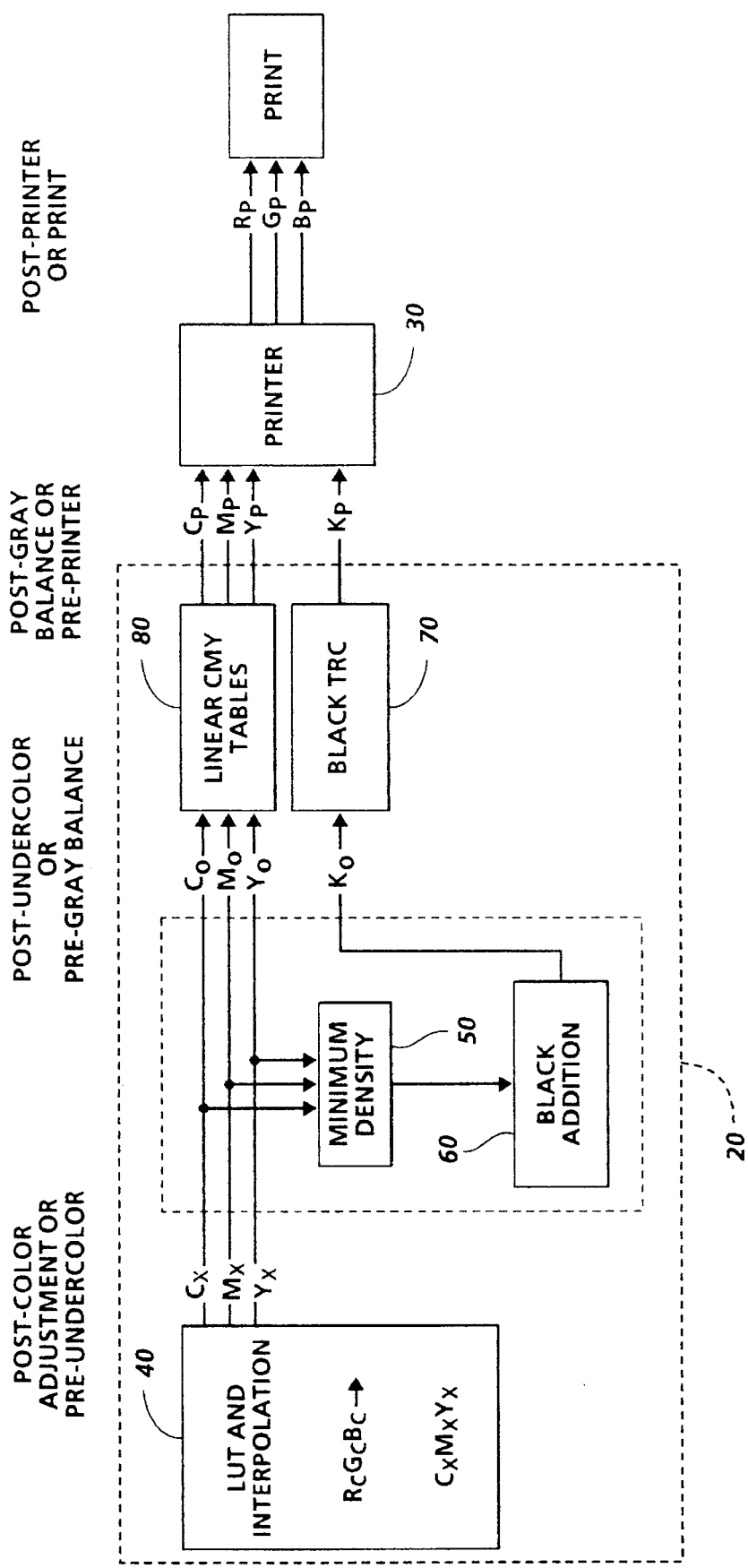
FIG. 4 is a block diagram showing the color space transform element of FIG. 3 in greater detail.

With reference now to FIG. 4, and color space transformation and color correction 20, initially, $R_c$, $G_c$, $B_c$ color signals are directed to an interpolation device, which includes a three dimensional look-up table stored in a device memory such as a RAM or other addressable memory device, which will meet speed and memory requirements for a particular device. Color signals $R_c$, $G_c$, $B_c$ are processed to generate address entries to the table which stores a set of transform coefficients with which the $R_c$, $G_c$, $B_c$ may be processed to convert them to $C_x$, $M_x$, $Y_x$ colorant signals or any multi-dimensional output color space including but not limited to CMYK or spectral data. Values which are not mapped may be determined through interpolation.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values. The values stored in the look-up table can be empirically derived, as in Sakamoto, or calculated or extrapolated based on empirical information, as in Po-Chieh Hung, "Tetrahedral Division Technique Applied to Colorimetric Calibration for Imaging Media", Annual Meeting IS&T, N.J., May, 1992, pp. 419–422; Po-Chieh Hung, "Colorimetric Calibration for Scanners and Media", SPIE, Vol. 1448, Camera and Input Scanner System, (1991); Sigfredo I. Nin, et al., "Printing CIELAB Images on a CMYK Printer Using Tri-Linear Interpolation", SPIE Proceedings, Vol. 1670, 1992, pp. 316–324; and James M. Kasson et al., "A Tetrahedral Interpolation Technique for Color Space Conversion", presented at IS&T/SPIE Electronic Imaging, January, 1993. For a color space conversion method using more than three dimensions, refer to U.S. Pat. No. 4,511,989 to Sakamoto.

To create the table, a set of color patches are created, preferably including determined linearization and black addition. This is done by printing and measuring about some 1000 to 4000 patches of printer colors distributed throughout the color space, i.e., a large set of printer driving signals are generated, in varying densities of combinations of C,M,Y,K, and used to drive the printer. The color of each patch is measured, using a spectraphotometer to determine color in terms of $R_c B_c G_c$. The measured colors of these patches are used to build a three dimensional look-up table (LUT) relating $R_c$, $B_c$, $G_c$ defined colors to $C_x M_x Y_x$ defined colors. Conversions that do not include mapped and measured points may be interpolated or extrapolated.

Figure 1:
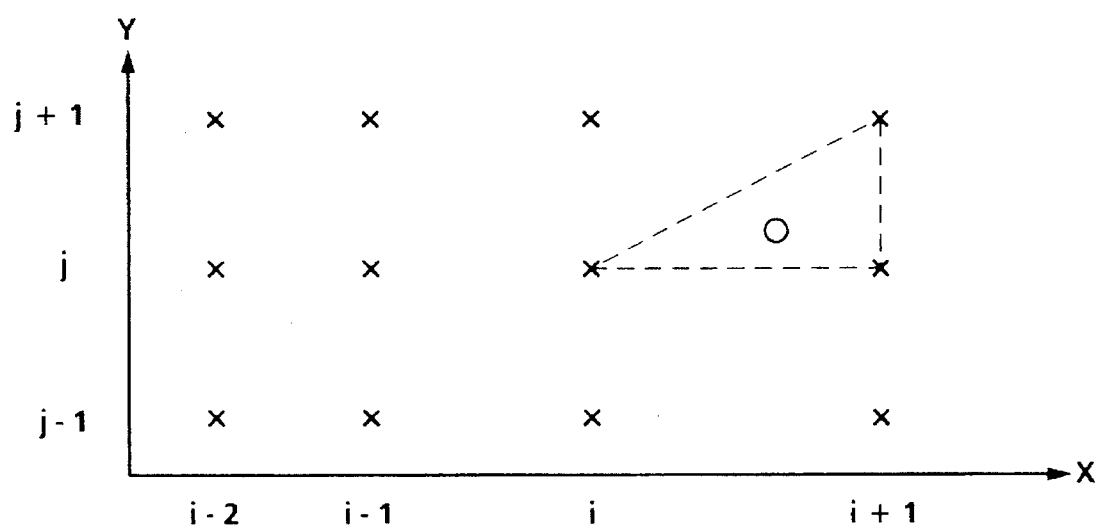
FIG. 1 illustrates the use of interpolation in determining relationship between disparate color spaces.
Figure 2:
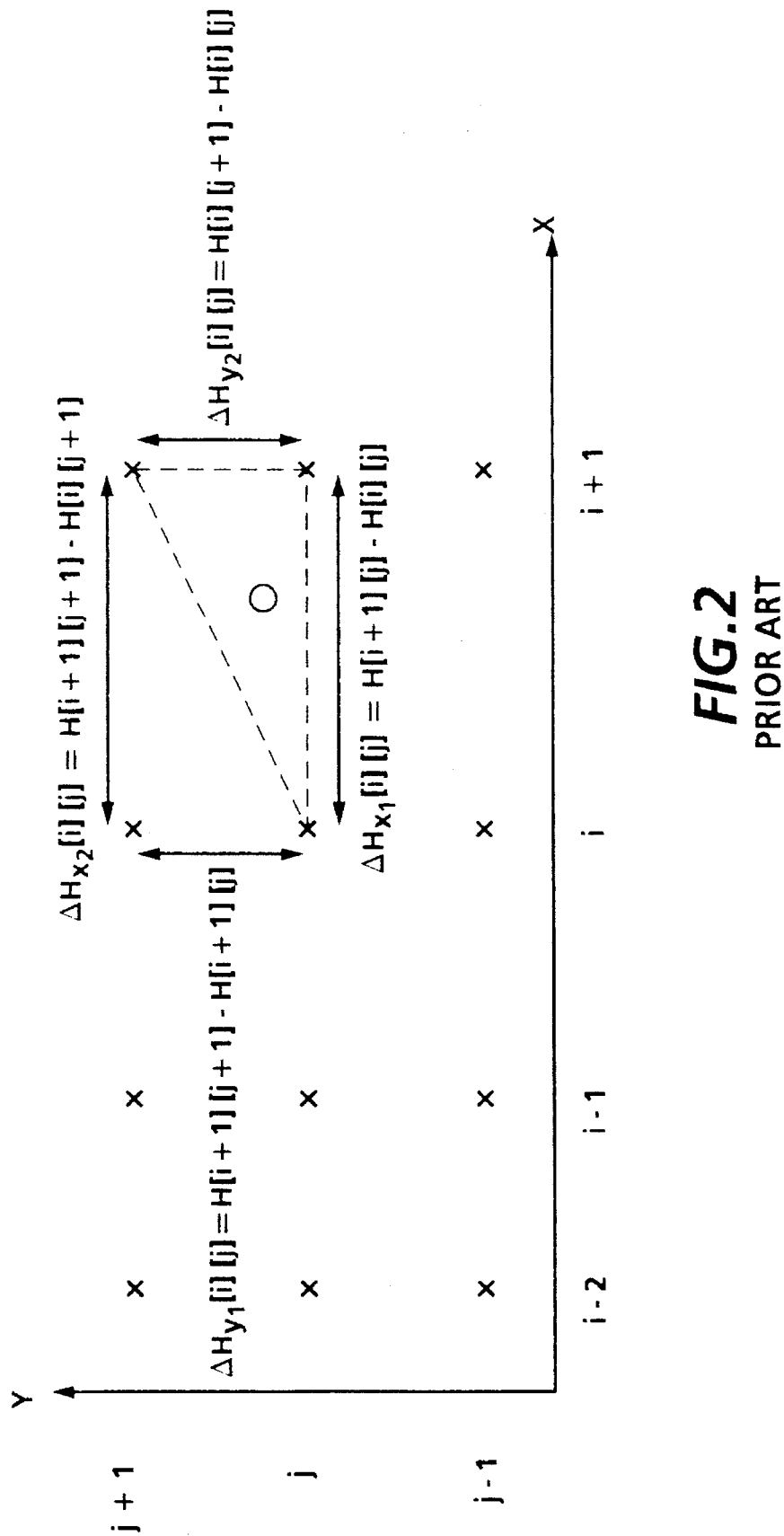
FIG. 2 illustrates the required variables for one type of color space interpolation.
Figure 5:
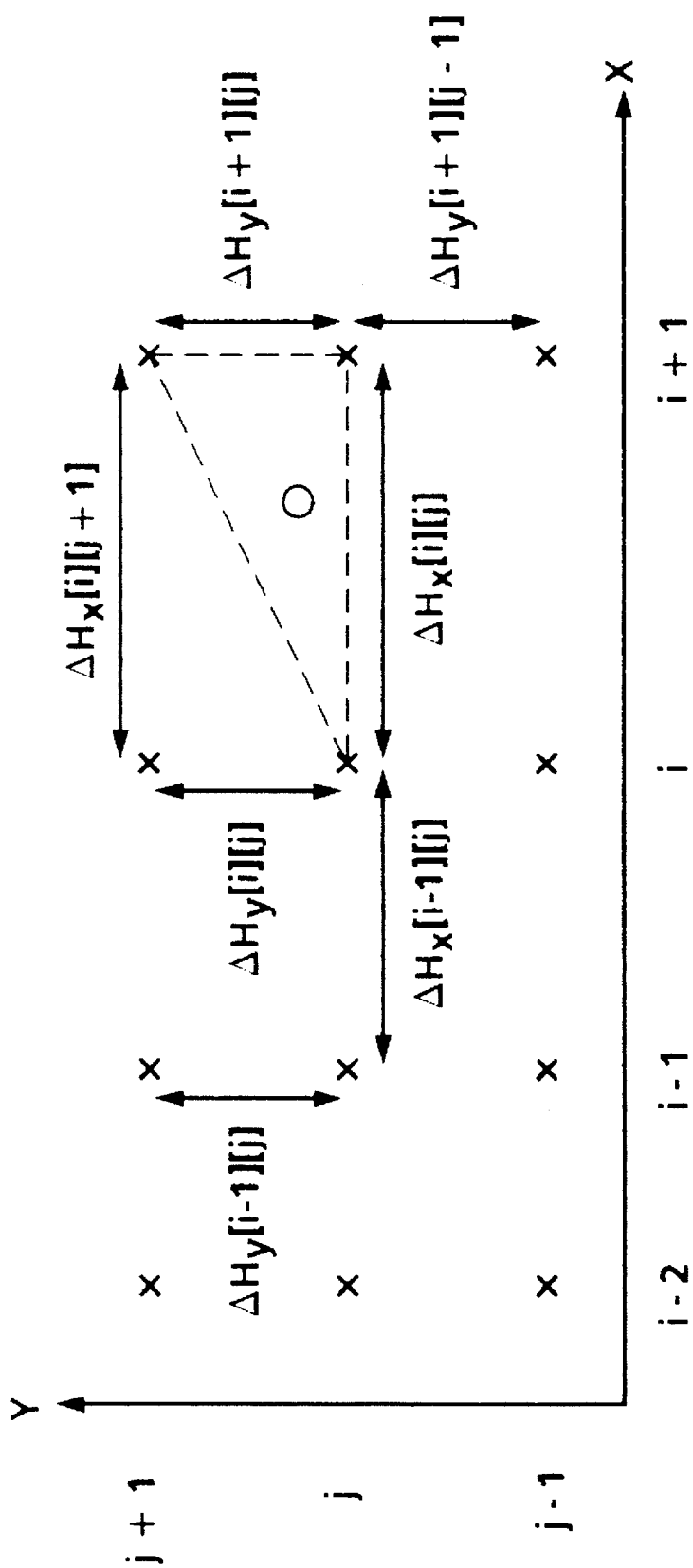
FIG. 5 shows the difference signal to be stored in a look-up table associated with each node.

As noted, and in accordance with the invention, given a table of data on a rectangular grid, interpolation is used to find the values of the function at points which are not included in the table. The differences between the known table values (i.e. in FIG. 1, 2, or 3 (H[i+1][j]−H[i][j]), etc.) must be calculated each time we wish to interpolate a point which falls within the region using this difference for interpolation. When processing a large number of pixels (i.e. an image) it may be advantageous to compute all the possible differences once, store them, and then use them when needed. The trade off in doing this is that you save the cost of computing the differences multiple times, and you pay the price of having to store and access the differences. With reference now to FIG. 5, the storage space needed for these difference values can be reduced by eliminating redundancy, and using a more complex addressing or indexing scheme to access any needed differences for the interpolation of a given color. Notice that the difference (H[i+1][j]−H[i][j]) will be stored as $\Delta H_{x1}$ in node [i][j] and as $\Delta H_{x2}$ in node [i][j−1]. This redundancy occurs at each node interface in the LUT. The redundancy can be removed if we store only the differences connected with the node point at each node point. That is, store only $\Delta H_{x1}$ (as $\Delta H_x$) and $\Delta H_{y2}$ (as $\Delta H_y$) with the node point at [i][j]. This means that to do an interpolation in the lower triangle as indicated above, one would have to access $\Delta H_x$ from the current location, and $\Delta H_y$ from the location [i+1][j]. Likewise, to do an interpolation in the upper triangle, one would access $\Delta H_y$ from the current location, and AHx from the location [i][j+1]. Accordingly, after finding the index of which rectangle you are in, you determine which tetrahedron you are in, and then calculate a new set of indices to access the differences required.

Figure 6:
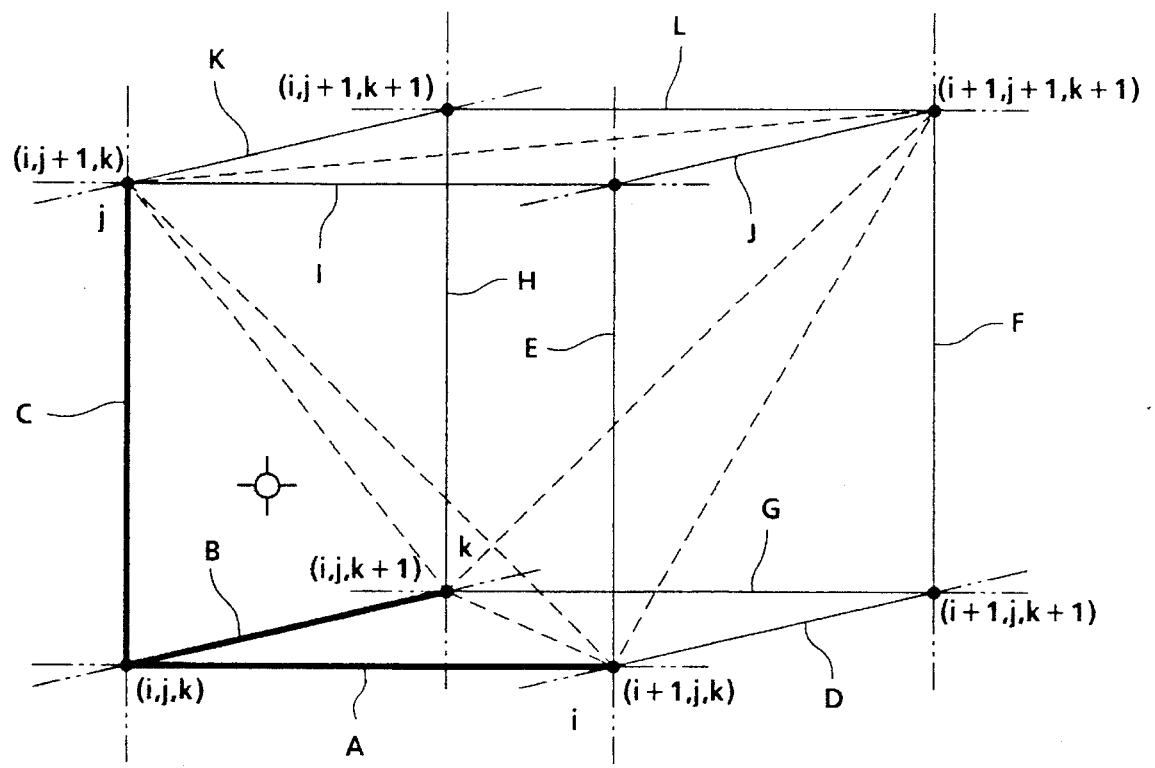
FIG. 6 illustrates for a three dimensional space the required difference signals, for a point P in space, a set of possible tetrahedra for interpolation and an indication of the difference signals stored for a given node.

With reference to FIG. 6, a rectangular volume in a three dimensional color space is shown, with nodes (i, j, k), (i+1, j, k), (i+1, j, k+1), (i,j,k+1), (i, j+1, k), i+1, j+1, k), (i+1,j+1,k+1), (i,j+1,k+1). Once again, these nodes represent color space coordinates for which there is an empirically determined color conversion. The color differences are lettered A through L. For each node, only those differences reflecting the distance to adjacent nodes in one direction. Thus, for node (i, j, k), differences A, B and C are stored, reflecting the distance to adjacent nodes in the increasing value direction.

Figure 7:
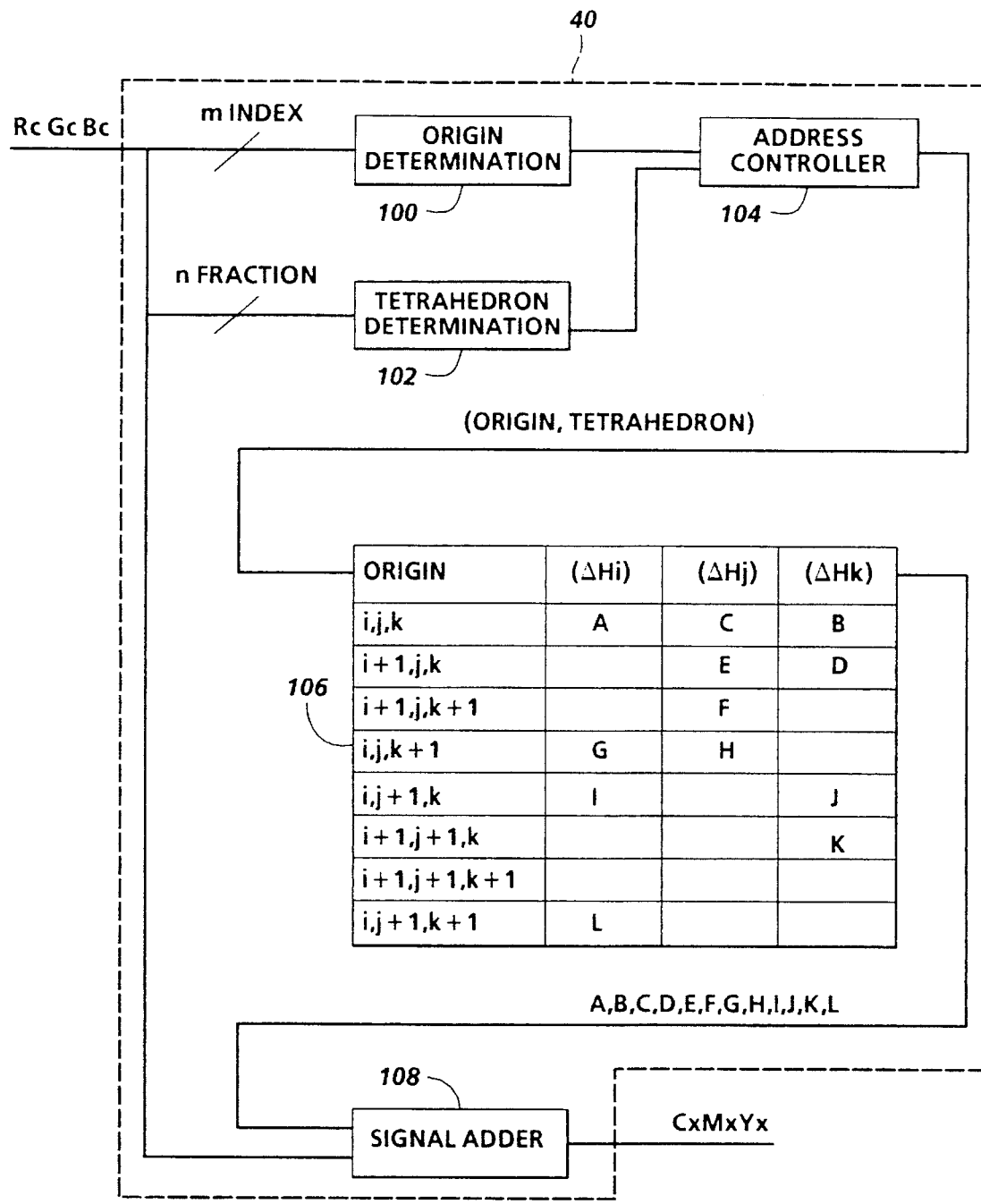
FIG. 7 shows a simplified interpolation system using the present invention.

FIG. 7 shows a simplified interpolator 40, which has a signal input receiving Rc, Gc, Bc values. The signals are converted into two parts, an index m part directed to origin determination 100, identifying which rectangular region the color signal is in, and a fraction n part directed to tetrahedron determination 102, identifying which tetrahedron the color signal is in. The output signals from origin determination 100 and tetrahedron determination 102 are directed as an input signal into address controller 104, which directs appropriate address signals to the look-up table shown as 106, which has as a physical embodiment any electronic signal storage device, such as RAM, to cause the table to output the appropriate difference signals. Any interpolation requiring differences A, B, or C will obtain the needed differences by referencing the look up table 106 at location (i+1,j,k), any interpolation requiring difference signals D or E will obtain the needed difference signals by referencing the look up table 106 at location (i+1, j, k) and so on for the remaining differences E through L. It will be noted that the appropriate index signals are indexed to a plurality of nodes. However, the nodes are predictable in that they represent nodes no more than 1 unit from the origin defining the rectangular space.

The output of LUT 106 is directed to a signal adder 108, which adds the value at the index point to the appropriate combinations of difference signals and fraction signals n to derive the interpolated value in the new color space, deriving the printer driver signals $C_x, M_x, Y_x$.

Figure 8:
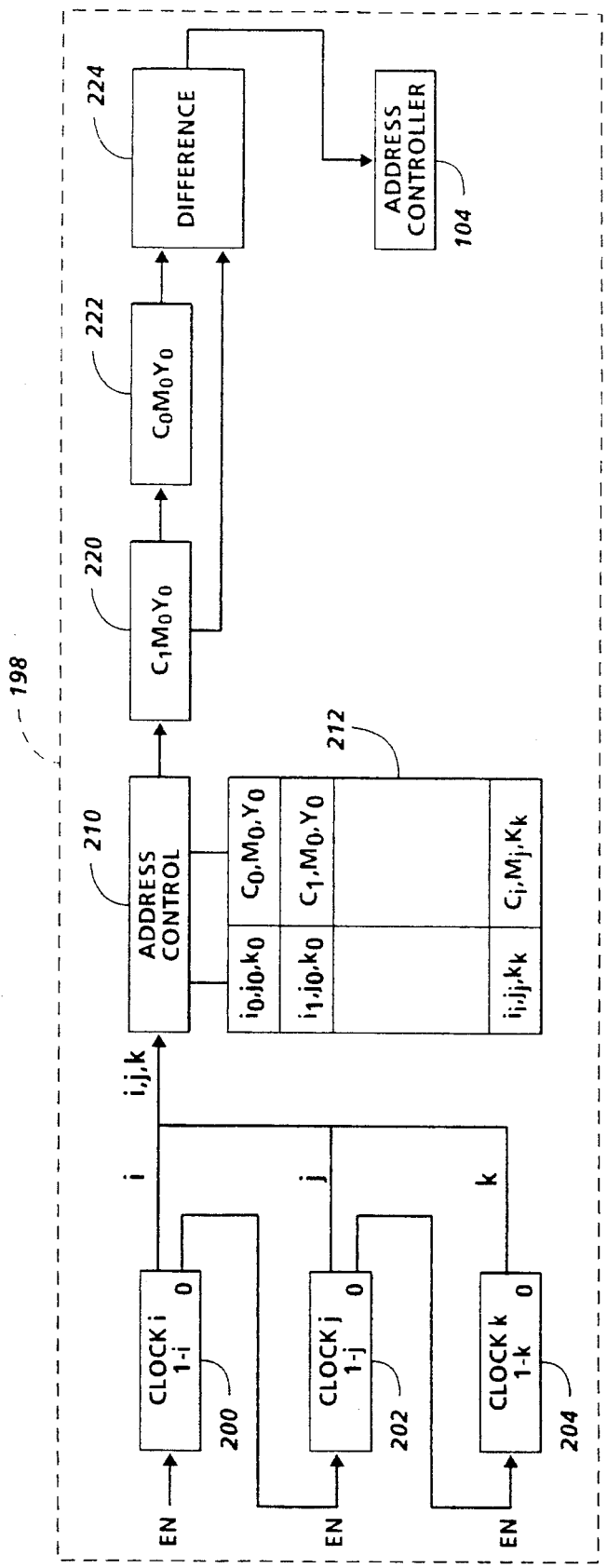
FIG. 8 illustrates a method for computing the tabulated differences.

With reference now to FIG. 8, an arrangement for calculating the difference values is shown as calculating processor 198. A series of clocks 200, 202, and 204 provide an incrementing signal through the total number of entries in the look-up table, as information to address controller 210. Address controller 210 retrieves from LUT 212 values for each clock cycle, representing the empirically derived color values for each successive input value. These empirically derived values are successively stored in latches 220 and 222, which in turn direct pairs of signals to a difference circuit 224 to determine the difference between successive signals. These signals are directed to address controller 104, which stores the values at appropriate locations in look-up table 106.

It will no doubt be appreciated that values unique to each cell may still be derived and stored for each cell. It will also be appreciated that the referred-to difference values may be a higher order function of multiple difference values.

It will no doubt be appreciated that while we have shown the use of the invention in the conversion of a device independent color space to a device dependent color space, the invention applies equally as well to conversions to any transformation from a first space to a second, device independent or device dependent.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A color space transformation system for converting first color space signals derived from an image creator device to a second color space signal directed to reproduce an image on a reproduction device, where a set of empirically derived output color signals are stored in a device memory, mapped to selected input color signals distributed through an input color space, and wherein for an input color signal which is not mapped to a stored output color signal, an interpolation processor is used to provide an output color signal, including an arrangement improving the efficiency of the interpolation processor comprising:

a. a calculating processor for calculating the distance in output color space between each output color and each of a predetermined set of output color neighboring color signals, and producing a set of difference signals as a function of said distances;

b. a difference memory, storing the difference signals received from said calculating processor, the difference signals stored at a plurality of addresses in said difference memory associated with corresponding input color signals;

c. a storage controller controlling the storage of said difference signals, and directing from the calculating processor to the difference memory at addresses therein associated with a known color only such digital difference digital distance signals as have not been previously stored for a neighboring known color;

d. said storage controller controlling the retrieval of said difference signals to the interpolation processor from addresses associated with the known color and neighboring known colors, as required to provide the correct distance signals for interpolation processing.

2. The system as defined in claim 1, wherein the first color space signals are defined in terms of red-green-blue color space.

3. The system as defined in claim 2, wherein the second color color space signals are defined in terms of a second red-green-blue color space.

4. The system as defined in claim 1, wherein the second color space signals are defined as a multi-dimensional output color space.

5. The system as defined in claim 3, wherein the second color space signals are defined in terms of cyan-magenta-yellow-black color space.

6. The system as defined in claim 1, wherein the first color space signals are defined in terms of cyan-magenta-yellow-black color space.

7. The system as defined in claim 1, wherein the second color space signals are defined in terms of cyan-magenta-yellow-black color space.

8. The system as defined in claim 1 wherein the first color space is colorimetric.

9. The system as defined in claim 1 wherein the second color space is device dependent.

10. The system as defined in claim 1 wherein the first color space is device dependent.

11. The system as defined in claim 1 wherein the second color space is colorimetric.

12. A printing system having a color print input, receiving input signals thereat describing a color print to be made in terms of a first color space, and a color space transform device for converting the first color space signals to a second color space whereby suitable printer driver signals are provided to drive a printer to reproduce the color print, the color space transform device including a device memory storing a set of empirically derived output colors at addresses corresponding to selected input colors distributed through the first color space, and an interpolation processor receiving an input color which does not correspond to a stored output color, and provide an interpolated output color, an arrangement improving the efficiency of the interpolation processor comprising:

a. a difference memory, having stored therein electromagnetic difference signals representing said distances between each output color signal in the second color space and a plurality of adjacent neighbors in color space, the difference signals stored at a like plurality of addresses in said difference memory associated with corresponding input colors;

b. control means, controlling the storage of said digital difference signals, and directing from the calculating means to the difference memory at addresses associated with a known color only such digital difference digital distance signals as have not been previously stored for a neighboring known color;

c. said control means controlling the retrieval of said difference signals for interpolation processing from addresses associated with the known color and neighboring known colors, as required to provide the correct distance signals for interpolation processing.

13. A printing system as defined in claim 12, wherein such digital difference digital distance signals as have not been previously stored for a neighboring known color includes only the difference signals describing the distance to three adjacent neighbors.

14. The system as defined in claim 12, wherein the first color space signals are defined in terms of red-green-blue color space.

15. The system as defined in claim 12, wherein the second color space signals are defined as a multi-dimensional output color space.

16. The system as defined in claim 15, wherein the second color space signals are defined in terms of cyan-magenta-yellow-black color space.

17. A color printing system including a color print input, receiving input signals thereat describing a color print to be made at a printer in terms of a first color space; a color printer, suitable for reproducing color prints, and responsive to printer colorant signals defined in terms of a second color space, distinct from the first color space; and a color space transform device for converting the first color space signals received at the color print input to a second color space whereby suitable printer driver signals are provided to drive the color printer to reproduce the color print, including:

a device memory storing a set of empirically derived output color signals at addresses corresponding to selected input colors distributed through the first color space, and an interpolation processor receiving an input color which does not correspond to a stored output color, and providing an interpolated output color as a function of the output color signals stored in the device memory;

a difference memory, storing difference signals representing distances between each output color signal and a preselected number of adjacent neighbors in the second color space which have not been previously stored for a neighboring output color signal; and control means, controlling the retrieval of said difference signals to the interpolation processor from addresses associated with a plurality of output color signals, as required to provide the correct distance signals for interpolation processing.

18. The system as defined in claim 17, wherein the first color space signals are defined in terms of red-green-blue color space.

19. The system as defined in claim 17, wherein the second color space signals are defined as a multi-dimensional output color space.

20. The system as defined in claim 19, wherein the second color space signals are defined in terms of cyan-magenta-yellow-black color space.

* * * * *